(12) United States Patent
Völker et al.

(10) Patent No.: US 12,709,484 B2
(45) Date of Patent: Aug. 18, 2026

(54) CONVEYING APPARATUS AND CONVEYING METHOD FOR GOODS

(71) Applicant: Dürkopp Fördertechnik GmbH, Bielefeld (DE)

(72) Inventors: Sigurd Völker, Vlotho (DE); Dirk Sieksmeier, Spenge (DE); Markus Merten, Bielefeld (DE); Axel Kleinekathöfer, Bielefeld (DE); Pascal Rehm, Bielefeld (DE)

(73) Assignee: Dürkopp Fördertechnik GmbH, Bielefeld (DE)

( * ) Notice: Subject to any disclaimer, the term of this patent is extended or adjusted under 35 U.S.C. 154(b) by 459 days.

(21) Appl. No.: 18/322,448

(22) Filed: May 23, 2023

(65) Prior Publication Data

US 2023/0382648 A1 Nov. 30, 2023

(30) Foreign Application Priority Data

May 24, 2022 (DE) ..................... 10 2022 205 209.9

(51) Int. Cl.
*B65G 1/04* (2006.01)
*B07C 5/36* (2006.01)
(Continued)

(52) U.S. Cl.
CPC ................ *B65G 17/12* (2013.01); *B07C 5/36* (2013.01); *B65G 1/1378* (2013.01);
(Continued)

(58) Field of Classification Search
CPC .... B65G 17/12; B65G 1/1378; B65G 17/002; B65G 43/10; B65G 47/38; B65G 1/0457; B07C 5/36
See application file for complete search history.

(56) References Cited

U.S. PATENT DOCUMENTS 2,643,761 A 6/1953 Wagner et al.
3,357,539 A 12/1967 Naslund
(Continued)

FOREIGN PATENT DOCUMENTS

AT 404717 B 2/1999
CH 714004 A1 1/2019
(Continued)

OTHER PUBLICATIONS

German Patent Office Action for Application No. 10 2022 205 209.9 dated Dec. 13, 2022 (6 pages including statement of relevance).
(Continued)

*Primary Examiner* — Thomas Randazzo
(74) *Attorney, Agent, or Firm* — Michael Best & Friedrich LLP

(57) ABSTRACT

A conveying apparatus for goods comprises at least one goods source which provides the goods by means of conveyor containers, a plurality of goods sinks to which the goods are conveyed, and an endless conveyor which connects the at least one goods source and the goods sinks in terms of conveying technology and has a first conveyor strand and a second conveyor strand which follows the first conveyor strand along a goods conveying direction in the endless conveyor, wherein only the first conveyor strand has a fixed conveyor container entrainment.

28 Claims, 2 Drawing Sheets

(51) Int. Cl.
*B65G 1/137* (2006.01)
*B65G 17/00* (2006.01)
*B65G 17/12* (2006.01)
*B65G 43/10* (2006.01)
*B65G 47/38* (2006.01)

(52) U.S. Cl.
CPC .......... *B65G 17/002* (2013.01); *B65G 43/10* (2013.01); *B65G 47/38* (2013.01); *B65G 1/0457* (2013.01)

(56) References Cited

U.S. PATENT DOCUMENTS

| | | | | |
|---|---|---|---|---|
| 4,244,672 | A | 1/1981 | Lund | |
| 6,595,346 | B1 | 7/2003 | Advani et al. | |
| 6,701,001 | B1 | 3/2004 | Kenneway et al. | |
| 6,762,382 | B1 * | 7/2004 | Danelski | B65G 17/002 209/912 |
| 8,335,585 | B2 | 12/2012 | Hansl et al. | |
| 8,776,694 | B2 * | 7/2014 | Rosenwinkel | B65G 17/345 104/88.02 |
| 11,780,686 | B2 * | 10/2023 | Eisinger | B65G 47/967 198/370.04 |
| 12,466,668 | B2 * | 11/2025 | Van Haaster | B65G 47/96 |
| 2010/0213031 | A1 | 8/2010 | Krech et al. | |
| 2014/0166553 | A1 | 6/2014 | Enenkel | |
| 2014/0303770 | A1 | 10/2014 | Wend et al. | |
| 2015/0175358 | A1 | 6/2015 | Otto | |
| 2017/0369248 | A1 | 12/2017 | Fenile | |
| 2018/0085788 | A1 | 3/2018 | Engel et al. | |
| 2018/0154399 | A1 | 6/2018 | Wagner et al. | |
| 2018/0333749 | A1 | 11/2018 | Wagner et al. | |
| 2019/0016539 | A1 | 1/2019 | Maines et al. | |
| 2019/0071219 | A1 | 3/2019 | Ueda et al. | |
| 2019/0375527 | A1 * | 12/2019 | Voelker | B65G 17/20 |
| 2020/0216262 | A1 | 7/2020 | Sigrist | |
| 2020/0251366 | A1 | 8/2020 | Wada | |
| 2021/0114813 | A1 * | 4/2021 | Lindley | B65G 1/1376 |
| 2021/0176433 | A1 | 6/2021 | Durtsch | |
| 2021/0206581 | A1 | 7/2021 | Ueda et al. | |
| 2021/0331873 | A1 * | 10/2021 | Vegh | B65G 43/10 |
| 2023/0139511 | A1 * | 5/2023 | Süss | B65G 47/38 |
| 2023/0382648 | A1 | 11/2023 | Völker et al. | |
| 2023/0382652 | A1 | 11/2023 | Sieksmeier et al. | |
| 2023/0385766 | A1 | 11/2023 | Sieksmeier et al. | |
| 2024/0417194 | A1 | 12/2024 | Rehm et al. | |
| 2025/0122021 | A1 | 4/2025 | Rehm et al. | |

FOREIGN PATENT DOCUMENTS

| | | | |
|---|---|---|---|
| CN | 115667098 | A | 1/2023 |
| DE | 1237020 | B | 3/1967 |
| DE | 1285404 | A | 12/1968 |
| DE | 3929301 | A1 | 3/1991 |
| DE | 102005006455 | A1 | 8/2006 |
| DE | 102009011230 | A1 | 9/2010 |
| DE | 102010010107 | A1 | 9/2011 |
| DE | 102011104511 | | 10/2012 |
| DE | 102011103194 | A1 | 12/2012 |
| DE | 102011116086 | A1 | 4/2013 |
| DE | 102014115579 | A1 | 4/2016 |
| DE | 102016105716 | A1 | 10/2017 |
| DE | 102018201675 | A1 | 8/2019 |
| DE | 102018201676 | A1 | 8/2019 |
| DE | 102018114026 | A1 | 12/2019 |
| DE | 102018221043 | A1 | 6/2020 |
| DE | 102019205980 | A1 | 10/2020 |
| DE | 102020214613 | A1 | 12/2021 |
| DE | 102021207911 | A1 | 1/2023 |
| DE | 102021132413 | B3 | 5/2023 |
| EP | 1690811 | A1 | 8/2006 |
| EP | 2130968 | A | 12/2009 |
| EP | 2301867 | A2 | 3/2011 |
| EP | 2418160 | A1 | 2/2012 |
| EP | 2620394 | A1 | 7/2013 |
| EP | 2709935 | B1 | 4/2015 |
| EP | 2885231 | B1 | 11/2019 |
| EP | 3666690 | | 6/2020 |
| EP | 3818001 | B1 | 9/2022 |
| EP | 4115994 | A1 | 1/2023 |
| EP | 4122849 | A1 | 1/2023 |
| KR | 102330956 | | 11/2021 |
| WO | 2008135371 | | 11/2008 |
| WO | 2018200503 | A1 | 11/2018 |
| WO | 2019016120 | | 1/2019 |
| WO | 2020004919 | A1 | 1/2020 |
| WO | 2023095049 | A1 | 6/2023 |
| WO | 2023194249 | A2 | 10/2023 |

OTHER PUBLICATIONS

European Search Report for Application No. 23172298.4 dated Oct. 10, 2023 (16 pages).

European Search Report for Application No. 23172301.6 dated Oct. 10, 2023 (9 pages).

Extended European Search Report and English translation for Application No. 23172299.2 dated Oct. 10, 2023 (8 pages).

Zhou Binghai et al: "A material handling scheduling method for mixedmodel automotive assembly lines based on an improved static kitting strategy", Computers & Industrial Engineering, Pergamon, Amsterdam, NL, vol. 140, Jan. 7, 2020, XP086001622, DOI: 10.1016/J.CIE.2020.106268.

German Patent Office Examination Report for Application No. 102022205210.2 dated Dec. 13, 2022 (7 pages ncluding statement of relevance).

European Patent Office Action for Application No. 23172299.2 dated Aug. 20, 2024 (8 pages including English machine translation).

* cited by examiner

CONVEYING APPARATUS AND CONVEYING METHOD FOR GOODS

CROSS-REFERENCES TO RELATED APPLICATIONS

This application claims priority to German Patent Application No. DE 10 2022 205 209.9, filed May 24, 2022, the content of which is incorporated herein by reference in its entirety as if fully set forth herein.

FIELD OF THE INVENTION

The invention relates to a conveying apparatus and a conveying method for goods.

BACKGROUND OF THE INVENTION

In conveying systems, goods are conveyed, in particular individually, from one or more goods sources to one or more goods sinks. The goods are allocated to a specific goods sink and conveyed there from the goods source. When an order is processed at the goods sink, a quantity of goods, i.e., a number of goods, must be temporarily stored there, i.e., temporarily buffered. The required size of the goods storage unit at the goods sink increases proportionally with the transport time from the goods source to the goods sink and with the goods processing performance at the goods sink. A conveying system of this type requires a large amount of space. The investment costs for a conveying system of this type are high.

SUMMARY OF THE INVENTION

It is an object of the present invention to simplify the conveyance of goods and to reduce the required space, in particular in the region of goods sinks.

This object is achieved according to the invention by a conveying apparatus for goods comprising at least one goods source which provides the goods by means of conveyor containers, a plurality of goods sinks to which the goods are conveyed, an endless conveyor which connects the at least one goods source and the goods sinks in terms of conveying technology and has a first conveyor strand and a second conveyor strand which follows the first conveyor strand along a goods conveying direction in the endless conveyor, wherein only the first conveyor strand has a fixed conveyor container entrainment, and by a conveying method for goods, comprising the method steps of providing the goods by means of conveyor containers at least one goods source, conveying the goods along a goods conveying direction to one of a plurality of goods sinks by means of a closed endless conveyor which has a first conveyor strand and a second conveyor strand which follows the first conveyor strand in the goods conveying direction, wherein the goods are conveyed only along the first conveyor strand with fixed conveyor container entrainment.

In a conveying apparatus at least one goods source is connected in terms of conveying technology to a plurality of goods sinks by means of an endless conveyor, wherein the endless conveyor is designed to circulate endlessly, i.e., is closed in terms of conveying technology. It has been recognized that it is advantageous if the endless conveyor has a first conveyor strand and a second conveyor strand, wherein only the first conveyor strand has a fixed conveyor container entrainment. The second conveyor strand does not have a fixed conveyor container entrainment. The second conveyor strand has a buffer function. The second conveyor strand in particular serves to recirculate the goods and in particular as a bypass section in the endless conveyor with respect to the first conveyor strand. In particular, the closed endless conveyor is formed by the first conveyor strand and the second conveyor strand. In this case, the endless conveyor does not have any other conveyor strands.

It is also possible for the endless conveyor to have more than two conveyor strands, wherein there may be a plurality of first conveyor strands, i.e., with fixed conveyor container entrainment, and/or a plurality of second conveyor strands without fixed conveyor container entrainment. It is essential that only the first conveyor strands are designed with a fixed conveyor container entrainment. Accordingly, however, more than one conveyor strand, namely a plurality of first conveyor strands, can each have a fixed conveyor container entrainment.

It has been found that with the endless conveyor, and in particular with the second conveyor strand without fixed conveyor container entrainment, it is possible to decouple the conveyor containers and the conveyor container entrainment. This makes it possible, in particular, to engage the conveyor containers in the flow of goods of the endless conveyor at an adjustable distance, i.e., in terms of conveying technology, to feed them into the endless conveyor. Gaps in the, in particular recirculated, flow of goods, which arise in particular due to the discharge of goods to the goods sinks, can be closed by at least temporarily accumulating the goods in the second conveyor strand and/or by selectively engaging the goods from the at least one goods source. According to the invention, it is possible to post-compact the flow of goods.

One finding of the invention is based on the fact that the conveyor container and a conveyor drive which drives the conveyor containers in the endless conveyor can be decoupled at least in sections and/or at least temporarily, i.e., are not firmly connected to one another. This decoupling takes place along the second conveyor strand.

The endless conveyor itself has a buffer function and, in particular, enables flexible allocation of the goods in the endless conveyor to the goods sinks. Since the endless conveyor is directly connected to multiple goods sinks, a rigid allocation of goods to exactly one goods sink is dispensable. The method can be implemented flexibly.

The method according to the invention is particularly suitable for orderless quantity distribution and/or order-based distribution, which is used for e-commerce orders, for example. In order-based distribution, a quantity of goods that constitutes an order is allocated to a goods sink instead of individual goods. An order comprises at least one product and in particular a number of goods, wherein the goods are in particular different goods, i.e., different types of goods. In particular, the goods sinks each have a plurality of goods locations. Each goods location constitutes a buffer for at least one ordered product.

The goods conveyed in the conveyor containers can be clearly identified. For this purpose, the conveyor containers have identification means known per se, in particular RFID chips and/or machine-readable codes, in particular bar codes or QR codes. Reading devices are arranged along a goods conveying direction of the conveying apparatus, which serve to read the identification means. The conveyor containers with the goods conveyed therein can be tracked in the conveying apparatus. In particular, the position of each conveyor container within the conveying apparatus can be determined.

In particular, exactly one product is conveyed with each conveyor container. A conveyor container is in particular a conveyor bag, which is in particular transported in a suspended manner in the conveying apparatus. The conveying apparatus is in particular an overhead conveyor. A conveyor bag of this type is known, for example, from DE 10 2018 201 675 A1 or from DE 10 2018 201 676 A1. Alternatively, the conveyor container may also be a container for lying goods, in particular a crate or a cardboard box. In this case, the conveying apparatus is a horizontal conveyor, in particular a belt conveyor or band conveyor.

The goods source is in particular a warehouse, a sorting unit, in particular a matrix sorter, or a circulating storage unit. Goods that are required for the processing of orders can be removed from the goods source in a targeted and individual manner.

The conveying apparatus can be designed to be small and, in particular, with reduced space requirements for a buffer storage unit. A corresponding conveying method can be performed with reduced conveying time and thus more efficiently. The conveying apparatus and the conveying method are economically advantageous and efficient. In particular, it has been found that the number of conveyor containers provided for processing orders at the goods locations of the goods sinks can be reduced, in particular to about 10% of the number of conveyor containers according to a facility from the prior art, i.e, in particular a conveying apparatus without an endless conveyor according to the invention.

A conveying apparatus configured such that the first conveyor strand is connected to the at least one product source and the product sinks, in particular directly, enables a targeted and direct conveyance of goods from the goods source to the goods sinks.

A conveying apparatus configured such that the first conveyor strand has a conveyor drive means for fixed conveyor container entrainment, in particular a drive chain running in a conveyor rail and holding members cooperating therewith, which can each be coupled to a conveyor container, enables an uncomplicated conveyor container entrainment. The conveyor container entrainment is implemented in particular by means of a conveyor rail known per se and a drive chain running therein, which cooperates with entrainers. The entrainers are in particular designed as so-called roller adapters which can be conveyed in a guided manner in the conveyor rail. With regard to the design and function of such roller adapters, reference is expressly made to DE 10 2005 006 455 A1. The roller adapters enable the conveyor container to be coupled to the conveyor drive means, i.e., the drive chain.

Alternatively, the conveyor strand can be designed as a band conveyor or belt conveyor, which is driven by way of a conveyor drive means that is known per se. The band conveyor or belt conveyor is used to transport containers for horizontal conveyance.

A conveying apparatus configured such that the at least one goods source is a warehouse, a sorting unit, in particular a matrix sorter, or a circulating storage unit, enables a flexible and independent provision of the goods from the goods source. By allowing different types of goods sources to be coupled to the endless conveyor, the design freedom for the conveying apparatus is extended.

A conveying apparatus configured such that the goods sinks are designed as goods dispatching points, in particular packing places, is particularly suitable for the mail order business. The goods are dispensed at the goods sinks. In particular, the goods are discharged from the endless conveyor. At packing places, the goods of an order are packed, in particular loaded into a shipping container and the shipping container is closed. A shipping container can be a box, a cardboard box or a bag. At the packing places, the goods of an order are prepared for dispatch and, in particular, conveyed on to an outgoing goods zone of the conveying apparatus as a fully packed order.

A conveying apparatus configured such that the goods sink has an unloading unit, in particular an automatic unloading unit, for unloading the goods from the conveyor containers and/or a discharge unit for discharging the conveyor containers from the endless conveyor simplifies the discharge of goods at the goods sinks. With an unloading unit, the conveyor containers can be unloaded, in particular automatically. For example, an opening mechanism is provided which enables conveyor bags to be opened automatically so that the goods conveyed therein can fall downwards out of the conveyor container, in particular due to gravity.

Additionally or alternatively, the goods sink can have a discharge unit to discharge conveyor containers from the endless conveyor. The discharged conveyor containers can then be unloaded, in particular manually. A discharge unit is particularly advantageous if the conveyor container cannot be unloaded automatically. For example, the conveyor container can be a conveyor bag that cannot be opened automatically or is not intended to be opened automatically, or a clothes hanger that is transported in a suspended manner by the roller adapter and on which a piece of clothing is hung.

A conveying apparatus comprising a discharge line connected to the endless conveyor for discharging unloaded conveyor containers from the endless conveyor, wherein the discharge line is connected in particular to the first conveyor strand, in particular along the goods conveying direction between the goods sinks and the second conveyor strand, enables the discharge of unloaded conveyor containers from the endless conveyor. A discharge line is designed in particular at the first conveyor strand and in particular in the goods conveying direction between the goods sinks, in particular the last goods sink, and the second conveyor strand. It is also conceivable that the endless conveyor has a plurality of discharge lines, each of which is connected to a discharge unit. It is also conceivable that a plurality of discharge units open into one discharge line.

A conveying apparatus configured such that the first conveyor strand has a first conveyor length ($I_{F1}$) and the second conveyor strand (8) has a second conveyor length ($I_{F2}$), wherein: $I_{F1}>I_{F2}$, in particular $I_{F1}>5\cdot I_{F2}$, in particular $I_{F1}>10\cdot I_{F2}$, enables efficient conveyance of goods. In particular, the conveying rate is increased. It has been recognized that the conveying rate of the first conveyor strand is critical to the overall conveying rate of the conveying apparatus.

A conveying apparatus configured such that the second conveyor strand is designed as an accumulation conveyor, in particular as a gravity conveyor and in particular as a conveyor rail that is inclined downwards with respect to the horizontal, simplifies the intermediate storage of the goods in the second conveyor strand. In this case, the second conveyor strand can be designed as a gravity conveyor in a particularly advantageous and uncomplicated manner. As a gravity conveyor, the second conveyor strand is arranged at an angle of inclination relative to the horizontal, wherein the inclination corresponds to the circulating direction of conveyance of the goods. The angle of inclination is in particular no more than in particular no more than 10°, in particular no more than 8°, in particular no more than in particular no more than 3° and in particular at least 1°. With the gravity conveyor, the goods are automatically conveyed along the second conveyor strand by gravity. In addition or as an alternative to gravity conveyance, a separate conveyor drive for machine-assisted conveyance can be provided on the second conveyor strand.

If the conveying apparatus is an overhead conveying system, the accumulation conveyor can in particular also be designed as a power-and-free conveyor, i.e., in particular as a two-rail system with an upper rail in which a drive chain runs and a lower rail in which the entrainers, i.e., roller adapters, run. In this case, the roller adapters are positively coupled to the drive chain and can be disengaged as required so that the drive chain can circulate continuously and the individual roller adapters can still be stopped and/or discharged. Such a conveyor is also called an overhead twin rail chain conveyor.

If the conveying apparatus is a horizontal conveyor, the second conveyor strand may in particular be designed as a downwardly inclined ramp and/or runway. Additionally or alternatively, a driven conveyor belt may be provided.

A conveying apparatus configured such that the endless conveyor, in particular the first conveyor strand, is designed as an overhead conveyor for the suspended conveyance of the conveyor containers, wherein the overhead conveyor runs in particular vertically above the goods sinks, simplifies the automatic discharge of goods, in particular by automated unloading of the conveyor bags. It is particularly advantageous if the conveyor bags can be opened automatically such that the goods fall out of the conveyor bags. Alternatively, it is possible to swivel the conveyor bags, in particular around a horizontal axis, in such a manner that the goods fall out or slide out. The goods can be discharged from the goods bags directly into the goods sinks arranged below them due to gravity. Manual intervention is not required.

If, alternatively, a discharge unit is arranged at the goods sinks, it is advantageous if the conveyor containers are guided in a horizontal direction at a distance from the goods sinks. In particular, the first conveyor strand and/or the discharge unit are arranged vertically in relation to each other in such a manner that the conveyor bags are essentially at the same height level as the goods sinks. Unloading the conveyor bags at the goods sinks, especially manually, is ergonomically advantageous. Alternatively, additional conveyors, in particular vertical conveyors, can be provided at the discharge unit, which can compensate for a difference in the height level of the conveyor bags in relation to the goods sinks.

Conveyor bags which in particular can each be unloaded individually and/or in an automated manner simplify the conveyance of goods and in particular the automated operation of the conveying apparatus.

A conveying method for goods, comprising the method steps of providing the goods by means of conveyor containers at least one goods source, conveying the goods along a goods conveying direction to one of a plurality of goods sinks by means of a closed endless conveyor which has a first conveyor strand and a second conveyor strand which follows the first conveyor strand in the goods conveying direction, wherein the goods are conveyed only along the first conveyor strand with fixed conveyor container entrainment, has substantially the advantages of operating the conveying apparatus. According to the invention, it has been recognized that the storage capacity at the goods sinks can be reduced by the flexible allocation of the goods to the goods sinks and by the direct service of the goods sinks with goods from the endless conveyor. The space required and the capital investment for the conveying apparatus are reduced.

A method in which the goods are accumulated in the second conveyor strand enables consolidation of the flow of goods. In the second conveyor strand, the goods that have not been discharged from the endless conveyor and are therefore conveyed in a circulating manner, i.e., are fed into the endless conveyor in a further circulation, can be temporarily stored and/or post-compacted. Gaps in the flow of goods can thus be efficiently avoided.

A conveying method comprising a return of goods from the second conveyor strand into the first conveyor strand, wherein in particular the return of the goods is carried out in preference over an insertion of the goods provided by the goods source, ensures the return of the goods. It has been found to be advantageous if the returned goods from the second conveyor strand are given preference over goods to be newly fed in from the goods source. In particular, this ensures that a full run of the second conveyor strand and thus an undesired jam in the second conveyor strand and thus in the flow of goods in the endless conveyor as a whole can be avoided.

A method in which at the goods sinks, the goods are unloaded, in particular automatically, from the conveyor containers by means of an unloading unit and/or the conveyor containers are discharged from the endless conveyor by means of a discharge unit increases in particular the efficiency of automation. In particular, it is possible to perform the delivery of the goods, i.e., the unloading and/or discharge, at a constant conveying speed. It has been recognized that a reduction of the conveying speed in the endless conveyor is dispensable. The goods are therefore discharged in particular at the nominal speed of the conveyor drive. The method is in particular a continuous conveying method. The method enables increased efficiency, i.e., an increased conveying rate.

Both the features indicated above and the features indicated in the following embodiment example of a conveying apparatus according to the invention are each suitable, alone or in combination with one another, for further refining the subject-matter according to the invention. The respective combinations of features do not constitute any restriction with regard to the further embodiments of the subject-matter of the invention, but are essentially merely exemplary in character.

BRIEF DESCRIPTION OF THE DRAWINGS

Further features, advantages and details of the invention will be apparent from the following description of an embodiment example with reference to the drawing.

DETAILED DESCRIPTION

Figure 1:
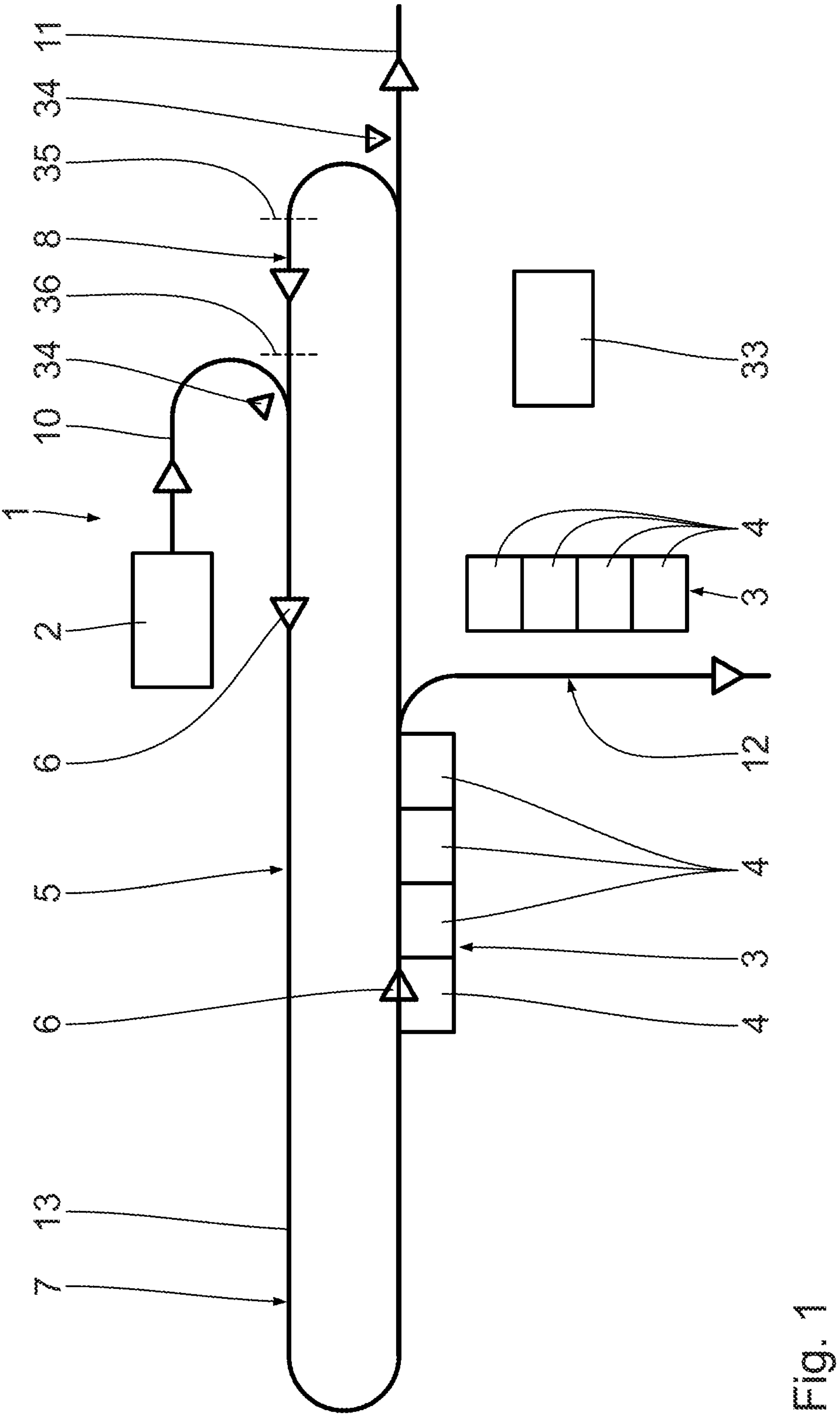
FIG. 1 shows a schematic illustration of a conveying apparatus according to the invention.

A conveying apparatus 1 which is shown purely schematically in FIG. 1 serves to convey goods from at least one goods source 2 to a plurality of goods sinks 3. The conveying apparatus can comprise a plurality of goods sources 2 which are arranged in particular parallel to one another. Each goods sink 3 has in particular a plurality of goods discharge points 4 which are in particular mechanically separated from one another, in particular in the form of partition walls. The goods discharge points 4 at a goods sink 3 can also be designed as separate throw-in shafts having a funnel-shaped goods receptacle which opens upwards in particular.

The goods sinks 3 are in particular packing places at which goods of an order can be packed and in particular handed over to an outgoing goods zone of the conveying apparatus 1 for dispatch.

The goods source 2 and the goods sinks 3 are connected in terms of conveying technology by means of an endless conveyor 5. The endless conveyor 5 has an endlessly circulating conveyor line and enables goods to be conveyed along the goods conveying direction 6, which is symbolized by an arrow in FIG. 1 and is oriented in the counterclockwise direction.

The endless conveyor 5 has a first conveyor strand 7 and a second conveyor strand 8. At the goods source 2, the goods are provided in conveyor containers and conveyed to the goods sinks 3 by means of the conveyor containers. The goods sinks 3 are in particular directly connected to the at least one goods source 2 via the first conveyor strand 7. In particular, exactly one product is arranged in each conveyor container.

The first conveyor strand 7 has a conveyor drive means, not shown in more detail, which enables a fixed conveyor container to be entrained. The conveyor drive means comprises in particular a drive motor and a drive chain that is mechanically coupled thereto. The drive chain is in particular arranged to be guided within a conveyor rail 13 of the first conveyor strand 7, in particular within a guide profile which is in particular made of plastic.

The first conveyor strand 7 and the second conveyor strand 8 are coupled to each other in terms of conveying technology at two transfer points 35, 36. The first transfer point 35 is arranged in the goods conveying direction 6 between the end of the first conveyor strand 7 and the beginning of the second conveyor strand 8. At the first transfer point 35, the conveyor containers are transferred from the fixed conveyor container entrainment in the first conveyor strand 7 to the second conveyor strand 8 without fixed conveyor container entrainment. At the second transfer point 36, which is arranged in the goods conveying direction 6 between the end of the second conveyor strand 8 and the beginning of the first conveyor strand 7, the goods are transferred from the second conveyor strand 8 to the fixed conveyor container entrainment in the first conveyor strand 7.

The goods source 2 is coupled to the endless conveyor 5 in terms of conveying technology via at least one feed conveyor strand 10, in particular downstream of the second conveyor strand 8 and in particular downstream of the conveyor drive means.

The second conveyor strand 8 is designed in particular as an accumulation conveyor and in particular as a gravity conveyor. It is particularly uncomplicated to design it as a gravity conveyor, which is in particular inclined downwards with respect to the horizontal. The inclination is in particular directed towards the first conveyor strand 7, in particular towards the conveyor drive means. The second conveyor strand 8 has a buffer function.

The conveying apparatus 1 comprises a plurality of goods sinks 3, in particular of different design. The goods sinks 3 can also be of identical design. The goods sinks 3 are spaced apart along the goods conveying direction 6, i.e., one behind the other. A first goods sink 3, shown on the left in FIG. 1, comprises an unloading unit, not shown in more detail, which enables the goods to be unloaded from the conveyor containers, in particular automatically. The first goods sink 3, and in particular the discharge compartments 4, are arranged spatially adjacent to the first conveyor strand 7. The automatic unloading unit can, for example, enable automatic opening or tilting of conveyor bags and/or automatic swiveling or tilting of horizontal conveyor containers, wherein the discharge compartments of the first goods sinks 3 are arranged in the discharge direction of the goods. The first goods sink 3 is thus arranged directly adjacent to the first conveyor strand 7.

Downstream of the goods sinks 3, a discharge line 11 is connected to the endless conveyor 5. The discharge line 11 serves to discharge, in particular automatically, emptied conveyor containers from the endless conveyor 5. The discharge line 11 leads in particular to a loading station that is not shown, at which the conveyor containers can be loaded with goods. The discharge line 11 can in particular also be connected to a buffer storage unit in order to temporarily store empty conveyor containers.

The discharge line 11 can be omitted, in particular if automatic emptying of the conveyor containers by means of an unloading unit does not take place.

A second goods sink 3 shown on the right in FIG. 1 is connected to the endless conveyor 5, in particular to the first conveyor strand 7, by means of a discharge unit 12. The second goods sink 3 can be arranged at a spatial distance from the first conveyor strand 7, wherein a connection in terms of conveying technology to the first conveyor strand 7 is ensured by means of the discharge unit 12. The discharge unit 12 is in particular designed to be identical to the discharge line 11. The discharge unit 12 enables the targeted discharge of conveyor containers from the endless conveyor 5 into the discharge unit 12. In the region of the second goods sink 3, the conveyor containers are stopped by means of a stopper, which is not shown in more detail, and then unloaded, in particular manually. It is conceivable that the discharge unit 12 leads to a loading station analogously to the discharge line 11. It is also conceivable that the discharge unit 12 merges with the discharge line 11 or that the discharge unit 12 opens into the discharge line 11. In particular, a plurality of discharge units 12 can be connected to the endless conveyor. It is advantageous if either a discharge unit 12 or an unloading unit is provided for every second goods sink 3.

Figure 2:
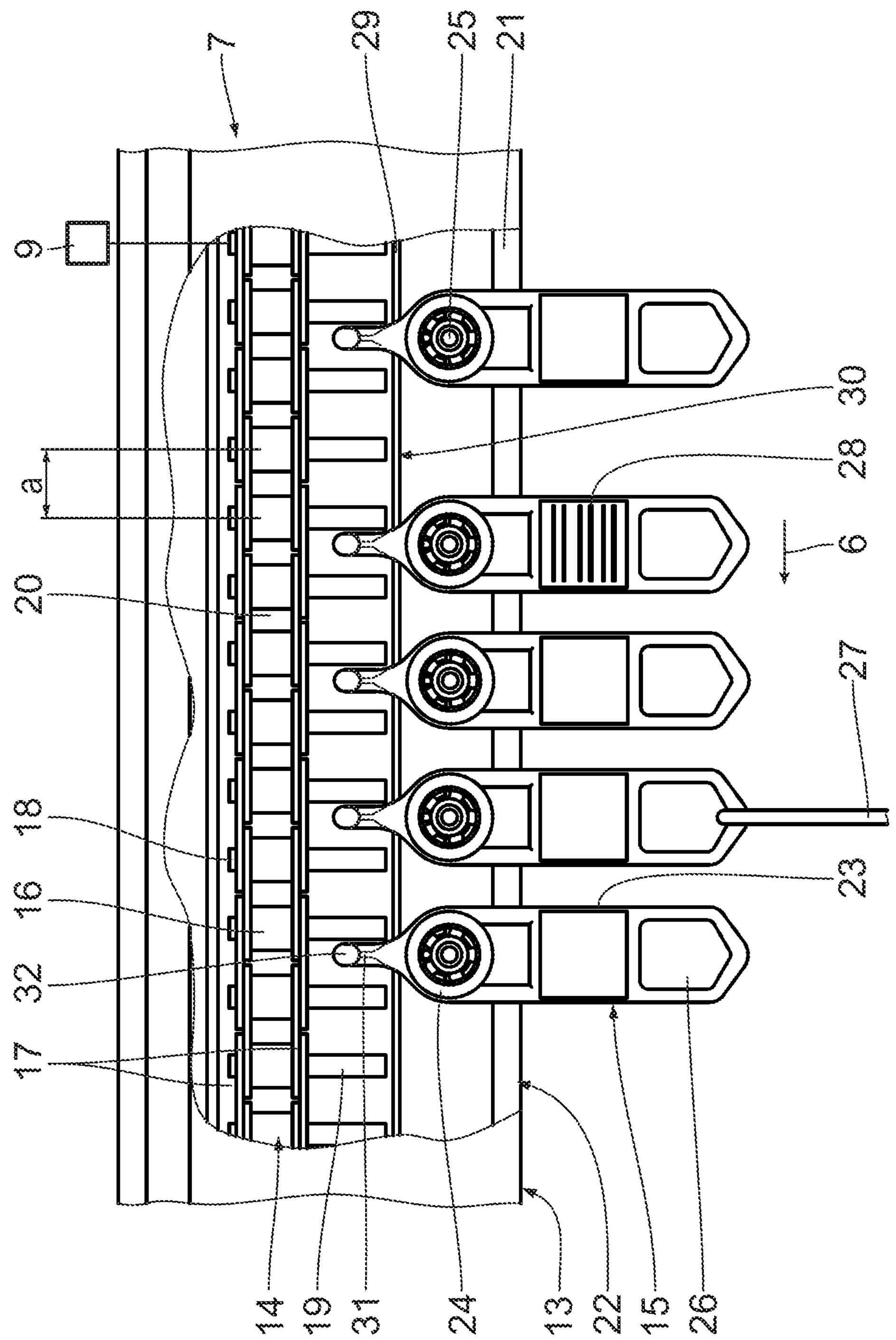
FIG. 2 shows an enlarged, partially cut-out side view of a first conveyor strand of an endless conveyor for a conveying apparatus according to FIG. 1 in the form of an overhead conveyor.

The first conveyor strand 7 is explained in more detail with reference to FIG. 2.

The first conveyor strand 7 is designed as a conveyor rail 13, which is also referred to as a transport rail. Accordingly, the conveying apparatus 1 is an overhead conveyor. The transport rail 13 can be moved in a room by means of suitable carrying devices. The transport rail 13 is designed as a hollow box profile in which a drive chain 14 is arranged and can be driven in the goods conveying direction 6 by means of the drive 9 that is shown purely schematically in FIG. 2.

Holding members 15 can be moved along the transport rail 13 by means of the drive chain 14. The drive chain 14 and the drive 9 form a conveyor drive means for the first conveyor strand 7. The drive 9 is in particular an electric motor drive which is mechanically coupled to the drive chain 14, i.e., for power transmission, by means of a power transmission member, in particular a drive gearwheel.

The drive chain 14 is a so-called roller chain with rollers 16, which are connected to each other at a small distance from one another by means of connection pieces 17. Bolts 18 have downwardly projecting bolt-shaped extensions serving as entrainers 19. The bolts 18 with the entrainers 19 extend normally to the transport rail 13 in a vertical plane that is spanned by the goods conveying direction 6.

The drive chain 14 is guided and held in the transport rail 13 in the direction of the bolts 18, i.e., perpendicularly and transversely to the goods conveying direction 6 by means of guides 20 engaging under the connection pieces 17.

A centre-to-centre distance a between adjacent entrainers 19 in the transport rail 13 in the goods conveying direction 6 corresponds exactly to the pitch of the drive chain 14 and is therefore invariable and constant. The entrainers 19 define the fixed conveyor container entrainment.

On an underside of the transport rail 13, two guiding webs 21 are formed facing each other, between which a slot 22 extending in the longitudinal direction of the transport rail 13, i.e., in the goods conveying direction 6, is formed or defined. A flat supporting part 23 of each holding member 15 projects downwards out of the transport rail 13 through said slot 22. In its upper region, the holding member 15 has a caster 24 on each side of the supporting part 23, each of which is supported on one of the two guiding webs 21 and can be displaced thereon in the goods conveying direction 6. There is therefore only one pair of casters 24 which can rotate around a common axis 25 so that the entire holding member 15 can oscillate about the axis 25 in the transport rail 13.

The supporting part 23 has a receiving opening 26 at its lower end into which a conveyor container in the form of a conveyor bag 27 can be suspended. The conveyor bag 27 is shown purely schematically in FIG. 2. The holding member 15, which is conveyed to roll in the transport rail 13 by means of the casters 24 and which is suitable for receiving the conveyor bag 27 by means of the receiving opening 26, is also referred to as a roller adapter.

The holding member 15 has an identification member 28 that is designed as a transponder, in particular an RFID chip, or as a machine-readable code, in particular a barcode or QR code. The identification member 28 is arranged in particular between the receiving opening 26 and the underside of the transport rail 13 and can thus be read by a reading device, in particular in an automated manner. The identification member 28 extends in accordance with the arrangement of the plate-like supporting part 23 in the goods conveying direction 6, i.e., its main surface lies open transversely to the goods conveying direction 6, i.e., towards the side.

After being mechanically coupled to the holding member 15, the conveyor bag 27 with goods to be conveyed remains attached to the holding member 15 during the entire conveying process, i.e., it is "married" to the latter. The goods to be conveyed are therefore controlled via the identification member 28 and thus the holding member 15. Since again the entire transport is performed from the drive chain, it is very important that a holding member 15 assumes an absolutely unambiguous position relative to the drive chain 14 during transport.

The transport rail 13 has horizontal boundary webs 29 facing each other directly above the casters 24, which delimit a slot 30 in between. A stalk-like projection 31 of the holding member 15 extends through this slot 30 and is formed integrally with the supporting part 23 at the upper end thereof.

At the upper end of the stalk-like projection 31, a stop 32 is formed in the manner of a transverse bar, the extension of which horizontally transverse to the goods conveying direction 6 is greater than the width of the slot 30, so that when the holding member 15 is inclined relative to the transport rail 13, this stop 32 comes to rest on the boundary webs 29 and thus prevents further inclination of the holding member 15. The projection 31 and the stop 32 have the basic shape of a hammer, i.e., they are T-shaped.

The entrainers 19 of the drive chain 14 extend to immediately above the boundary webs 29, so that a holding member 15 located between two entrainers 19 is always reliably entrained, i.e., does not become disengaged from the entrainer 19.

The conveying apparatus 1 has a control unit 33 which is in signal connection in particular with the at least one goods source 2, the goods sinks 3, the endless conveyor 5 and/or the conveyor strands 7 and 8. The signal connection can be wired or wireless. In particular, the control unit 33 is in signal connection with the conveyor drive means in order to enable a targeted introduction of the conveyor bags 27 from the at least one goods source 2 or a return of the conveyor bags 27 from the second conveyor strand 8.

The conveying apparatus 1 has several reading units 34, which are arranged in particular at the entrance of the endless conveyor 5, i.e., where the feed conveyor strand 10 opens into the endless conveyor 5. A further reading unit 34 can be arranged in particular at the exit of the endless conveyor 5, i.e., where the discharge line 11 opens out from the endless conveyor 5 The reading units 34 serve to read the identification members 28, so that direct conclusions can be drawn about the respective position of the conveyor bags 27 in the conveying apparatus 1 and in particular within the endless conveyor 5.

The control unit 33 is in signal connection with the unloading unit and/or with the discharge unit 12 in order to ensure automatic unloading and/or discharge of the conveyor bags 27.

A conveying method for goods in the conveying apparatus 1 is explained in more detail below.

Various goods are provided at the at least one goods source 2. For this purpose, the goods are each arranged individually in a conveyor bag 27. The goods are fed in the conveyor bags 27 via the feed strand 10 to the endless conveyor 5 and, in particular, are transferred to the first conveyor strand 7 of the endless conveyor 5 and introduced there. Since the first conveyor strand 7, as shown in FIG. 2, is designed with fixed conveyor container entrainment, the conveyor bags 27 are each entrained in a roller adapter 15. The respective position of the conveyor bags 27 can be clearly assigned by means of the identification members 28.

The goods are conveyed endlessly and in circulation in the endless conveyor 5, i.e., they circulate along the goods conveying direction 6. If an order with at least one good is to be processed at one of the goods sinks 3, a request for goods necessary for this is registered via the control unit 33. By means of the control unit 33, the required goods are allocated to the corresponding goods sink 3 and conveyed there. Since the conveyor used for this purpose is an endless conveyor 5, multiple goods sinks 3 can be connected to the goods source 2 in terms of conveying technology. It is therefore essential that the goods are not already allocated to the goods sinks at or in the goods source 2, but can be flexibly allocated from the endless conveyor 5. In particular, the endless conveyor serves as a goods buffer in which the goods circulate until a corresponding request for goods is registered at one or more goods sinks 3. It is particularly advantageous that the endless conveyor 5 can be used in particular by all sinks, which increases the flexibility in conveying the goods and allocating the goods.

The goods are discharged at the respective goods sink, in particular by means of an automatic unloading or discharge of the conveyor bags 27 into a discharge unit 12. Unloaded conveyor bags 27 can be discharged from the endless conveyor 5 at the discharge line 11. Conveyor bags 27 that are not discharged are conveyed into the second conveyor strand 8, i.e., they remain in the endless conveyor 5. The conveyor bags 27 that are not discharged can be accumulated, i.e., consolidated, in the second conveyor strand 8. Possible gaps in the flow of goods are thus closed. The second conveyor strand 8 allows the conveyor bags 27 to be post-compacted. The conveyor drive means can be used to return the conveyor bags 27 that have accumulated in the second conveyor strand 8 to the first conveyor strand 7 with the fixed conveyor container entrainment. The second conveyor strand 8 thus serves to return goods to the flow of goods that have not been discharged.

What is claimed is:

1. A conveying apparatus for goods comprising:

at least one source of goods configured to provide goods via conveyor containers;

a plurality of sinks; and an endless conveyor coupling the at least one source of goods and the plurality of sinks, the endless conveyor including a first conveyor strand and a second conveyor strand following the first conveyor strand along a goods conveying direction, wherein only the first conveyor strand has a fixed conveyor container entrainment, and wherein the second conveyor strand is built without a fixed conveyor container entrainment such that the conveyor containers and the conveyor container entrainment are decoupled along the second conveyor strand.

2. The conveying apparatus according to claim 1, wherein the sinks of the plurality of sinks are designed as goods dispatching points.

3. The conveying apparatus according to claim 1, wherein the sinks of the plurality of sinks are designed as packing places.

4. The conveying apparatus according to claim 1, wherein the first conveyor strand has a first conveyor length and the second conveyor strand has a second conveyor length shorter than the first conveyor length.

5. The conveying apparatus according to claim 1, wherein the second conveyor strand is in the form of a gravity conveyor.

6. The conveying apparatus according to claim 1, wherein the second conveyor strand is in the form of an inclined conveyor rail.

7. The conveying apparatus according to claim 1, wherein the first conveyor strand is in the form of an overhead conveyor for suspended conveyance of the conveyor containers.

8. The conveying apparatus according to claim 1, wherein the first conveyor strand is connected to the at least one source of goods and the plurality of sinks.

9. The conveying apparatus according to claim 8, wherein the first conveyor strand is connected directly to the at least one source of goods and the plurality of sinks.

10. The conveying apparatus according to claim 1, wherein the first conveyor strand has a conveyor drive for fixed conveyor container entrainment.

11. The conveying apparatus according to claim 10, wherein the conveyor drive is in the form of a drive chain operable in a conveyor rail and cooperating holding members, each of which is couplable to a conveyor container.

12. The conveying apparatus according to claim 1, wherein the at least one source of goods is one of a warehouse, a sorting unit, or a circulating storage unit.

13. The conveying apparatus according to claim 12, wherein the sorting unit is a matrix sorter.

14. The conveying apparatus according to claim 1, wherein each sink of the plurality of sinks has an unloading unit for unloading goods from the conveyor containers and a discharge unit for discharging conveyor containers from the endless conveyor.

15. The conveying apparatus according to claim 14, wherein the unloading unit is an automatic unloading unit.

16. The conveying apparatus according to claim 1, further including a discharge line coupled to the endless conveyor for discharging unloaded conveyor containers from the endless conveyor.

17. The conveying apparatus according to claim 16, wherein the discharge line is coupled to the first conveyor strand.

18. The conveying apparatus according to claim 16, wherein the discharge line is coupled to the first conveyor strand along the goods conveying direction between the sinks of the plurality of sinks and the second conveyor strand.

19. The conveying apparatus according to claim 1, wherein the endless conveyor is in the form of an overhead conveyor for the suspended conveyance of the conveyor containers.

20. The conveying apparatus according to claim 19, wherein the overhead conveyor is operable vertically above the plurality of sinks.

21. The conveying apparatus according to claim 19, wherein the conveyor containers are each in the form of conveyor bags.

22. The conveying apparatus according to claim 21, wherein the conveyor bags are each configured to be unloaded individually and/or in an automated manner.

23. A conveying method for goods, the method comprising:

providing goods via conveyor containers at at least one source of goods; and conveying goods along a goods conveying direction to one sink of a plurality of sinks via a closed endless conveyor having a first conveyor strand and a second conveyor strand following the first conveyor strand in a goods conveying direction, wherein goods are conveyed only along the first conveyor strand with fixed conveyor container entrainment, and wherein the goods are accumulated in the second conveyor strand.

24. The conveying method according to claim 23, further comprising returning goods from the second conveyor strand into the first conveyor strand.

25. The conveying method according to claim 24, wherein returning goods is prioritized over an insertion of goods from the source of goods.

26. The conveying method according to claim 23, further comprising unloading at least one good from the conveyor containers at the sinks of the plurality of sinks and discharging the conveyor containers from the endless conveyor.

27. The conveying method according to claim 26, wherein the unloading is an automated unloading.

28. A conveying apparatus for goods comprising:

at least one source of goods configured to provide goods via conveyor containers;

a plurality of sinks; and an endless conveyor coupling the at least one source of goods and the plurality of sinks, the endless conveyor including a first conveyor strand and a second conveyor strand following the first conveyor strand along a goods conveying direction, wherein only the first conveyor strand has a fixed conveyor container entrainment, and wherein the second conveyor strand is in the form of an accumulation conveyor.

* * * * *